(12) United States Patent
Funaki et al.

(10) Patent No.: US 6,943,229 B2
(45) Date of Patent: Sep. 13, 2005

(54) LOW CRYSTALLIZABILITY POLYPROPYLENE SHEET

(75) Inventors: Akira Funaki, Chiba (JP); Masahiro Kubo, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 37 days.

(21) Appl. No.: 10/473,136

(22) PCT Filed: Apr. 6, 2001

(86) PCT No.: PCT/JP01/02974

§ 371 (c)(1),
(2), (4) Date: Oct. 6, 2003

(87) PCT Pub. No.: WO02/083768

PCT Pub. Date: Oct. 24, 2002

(65) Prior Publication Data

US 2004/0101703 A1 May 27, 2004

(51) Int. Cl.⁷ .............................. C08F 110/06; C08J 5/18
(52) U.S. Cl. .................... 526/351; 526/348.1; 264/479; 264/544; 264/556; 264/557; 264/210.1; 264/331.15; 428/220; 428/339
(58) Field of Search ................................. 264/479, 544, 264/210.1, 331.15, 556, 557; 428/220, 339, 332; 526/348.1, 351

(56) References Cited

FOREIGN PATENT DOCUMENTS

| EP | 614748 | | 9/1994 |
|---|---|---|---|
| EP | 803340 | | 10/1997 |
| JP | 61-130018 | * | 6/1986 |
| JP | 63-60726 | | 3/1988 |
| JP | 10-1548 | | 1/1998 |
| JP | 2000-246785 | | 9/2000 |
| JP | 2001-30362 | | 2/2001 |

* cited by examiner

Primary Examiner—Roberto Rabago
(74) Attorney, Agent, or Firm—Oblon, Spivak, McClelland, Maier & Neustadt, P.C.

(57) ABSTRACT

A low crystallizability polypropylene sheet which has an average spherulite radius between 0.1 $\mu$m and 4 $\mu$m, an average number of spherulites of 600/mm² or less in a sheet cross section, a solid density of 0.895 g/cm³ or less, a fusion enthalpy H of less than 90 J/g at the highest endothermic peak of the differential scanning calorimetry (DSC) curve, a degree of gloss of 90% or higher on at least one side and shows an exothermic peak of 1 J/g or higher at the low temperature side of said highest endothermic peak and a thickness of 50 $\mu$m or more.

14 Claims, 3 Drawing Sheets

US 6,943,229 B2

LOW CRYSTALLIZABILITY POLYPROPYLENE SHEET

TECHNICAL FIELD

The present invention relates to a low crystallizability polypropylene sheet.

BACKGROUND ART

In the conventional process of manufacturing a polypropylene sheet, using polypropylene type resin as raw material, the sheet is generally cooled for the purpose of improving its transparency. However, when the sheet has a thickness exceeding 50 µm, a technique of adding a nucleating agent is employed to improve the transparency because it is difficult to uniformly cool such a thick sheet and attain a satisfactory level of transparency.

However, a polypropylene sheet molded by adding a nucleating agent shows an enhanced level of crystallinity because of an increase of the number of defective crystals and that of spherulites. Then, as a result, the softening point of the sheet rises to by turn give rise to a problem that, when applying heat to the polypropylene sheet for secondary processing (thermoforming), the processing temperature range becomes narrowed to make the thermoforming very difficult.

Then, a special forming apparatus is required to thermoform a transparent polypropylene sheet and this problem has prevented the scope of application of products of thermoformed transparent polypropylene sheets from expanding.

An object of the present invention is to provide a low crystallizability polypropylene sheet that can be thermoformed with ease at low temperature without employing a special forming apparatus and secure an enhanced level of transparency and luster after forming.

DISCLOSURE OF THE INVENTION

A low crystallizability polypropylene sheet according to the invention characterized in that it has an average spherulite radius between 0.1 µm and 4 µm, an average number of spherulites of 600/mm$^2$ or less in a sheet cross section, a solid density of 0.895 g/cm$^3$ or less, a fusion enthalpy H of less than 90 J/g at the highest endothermic peak of the differential scanning calorimetry (DSC) curve, a degree of gloss of 90% or higher on at least one side and shows an exothermic peak of 1 J/g or higher at the low temperature side of the highest endothermic peak and a thickness of 50 µm or more.

When the average spherulite radius is greater than 4 µm, the internal haze disadvantageously rises (to lower the transparency). Preferably, the average spherulite radius is 3 µm or less. When the average number of spherulites is greater than 600/mm$^2$ in a sheet cross section, the softening point of the sheet disadvantageously rises. Preferably, the average number of spherulites is 400/mm$^2$ or less. When the solid density is greater than 0.895 g/cm$^3$, the density becomes disadvantageously too large and the crystallinity becomes disadvantageously too high. Finally, when the thickness of the sheet is not greater than 50 µm it is difficult to provide a formed product (container or the like) showing a satisfactory level of rigidity after a thermoforming process.

A sheet as defined above can be manufactured by means of an apparatus and a method as described below.

For instance, it can be manufactured by using an apparatus having a mirror plane endless belt wound around a plurality of cooling rolls and a mirror plane cooling roll and introducing fused polypropylene (not containing a nucleating agent) extruded from a T-die extruder into the gap between the mirror plane cooling roll and the mirror plane endless belt to mold a sheet by pressing the fused polypropylene, which molded sheet being cooled vehemently and sufficiently to temperature lower than a predetermined temperature level.

For the purpose of the present invention, a low crystalizability polypropylene sheet may be either a single layer sheet of low crystallizability polypropylene or a multilayer sheet including low crystalizability polypropylene sheets.

As pointed out above, according to the invention, there is provided a polypropylene sheet having an average spherulite radius between 0.1 µm and 4 µm, an average number of spherulites of 600/mm$^2$ or less and a solid density of 0.895 g/cm$^3$ or less and containing a nucleating agent. Therefore, according to the invention, it is possible to obtain a sheet that shows a low thermally softening point and is substantially free from internal haze (and hence excellently transparent). Such a sheet can be formed at low temperature without using any special forming apparatus so that it is possible to reduce the manufacturing cost. Additionally, it is possible to obtain a thermoformed product that is transparent and highly glossy by thermoforming such a tow crystalizability polypropylene sheet.

Additionally, since the fusion enthalpy H is held to a relatively low level of less than 90 J/g and emission of heat of 1 J/g or more is observable at the low temperature side, only a small quantity of heat is required to externally soften the sheet and the sheet is softened at relatively low temperature to further facilitate low temperature forming.

Still additionally, a low crystallizability polypropylene sheet according to the invention shows a degree of gloss of not lower than 90%. In other words, it is highly glossy so that the thermoformed product formed by using such a sheet is also highly glossy and hence can have a high market value.

When a low crystallizability polypropylene sheet according to the invention is made to have a thickness of tmm, the internal haze of the low crystallizability polypropylene sheet is preferably not higher than $(330t^2-150t+20)\%$.

Note that the formula of $(330t^2-150t+20)\%$ is obtained by the method of least squares, observing the relationship between the internal haze and the sheet thickness.

When the internal haze is higher than the above value, the thermoformed product formed by thermoforming a polypropylene sheet is poorly transparent and hence disadvantageous as product. In other words, the internal haze of a thermoformed product can be held to $(330s^2-150s+25)\%$ or less (s: the thickness of the thermoformed product (mm)) when the internal haze of the polypropylene sheet is within the above range.

The tensile modulus of a low crystallizability polypropylene sheet according to the present invention is preferably 1,500 MPa or less.

If the tensile modulus of a low crystallizability polypropylene sheet is greater than 1,500 MPa, it is too tough to be thermoformed and its tensile modulus can fall to make the formed product short of strength.

The tensile modulus of the thermoformed product is held to 1,700 MPa or higher to make the product show a sufficiently high strength when the tensile modulus of the polypropylene sheet is held within the above defined range.

For the purpose of the invention, the tensile modulus is determined by observing the polypropylene sheet along the moving direction (MD direction) thereof during the sheet manufacturing process by means of a method conforming to JIS K7113.

A low crystallizability polypropylene sheet according to the present invention may be made of a raw material selected from four raw materials of homo polypropylene, random polypropylene, block polypropylene and a mixture of these.

For the purpose of the invention, random polypropylene and block polypropylene may be copolymer of ethylene and propylene. Particularly, random copolymer of ethylene and propylene is highly transparent.

Preferably, the raw material as described above contains petroleum resin and/or terpene resin.

For the purpose of the invention, petroleum resin can be selected from resin obtained by using petroleum type unsaturated hydrocarbons as raw material. Such resin can be typically obtained by thermally copolymerizing cyclopentadiene and/or higher olefinic hydrocarbons in the presence of an acidic catalyst.

For the purpose of the invention, terpene resin can be obtained by polymerizing terpenic compounds such as turpentine oil, α-pinene or dipentene in the presence of an acidic catalyst.

The softening point of a low crystallizability polypropylene sheet according to the invention can be lowered by adding petroleum resin and/or terpene resin to the polypropylene raw material to further facilitate the thermoforming operation to be conducted at low temperature.

BEST MODE FOR CARRYING OUT THE INVENTION

Now, an embodiment of the present invention will be described by referring to the accompanying drawings.

Figure 1:
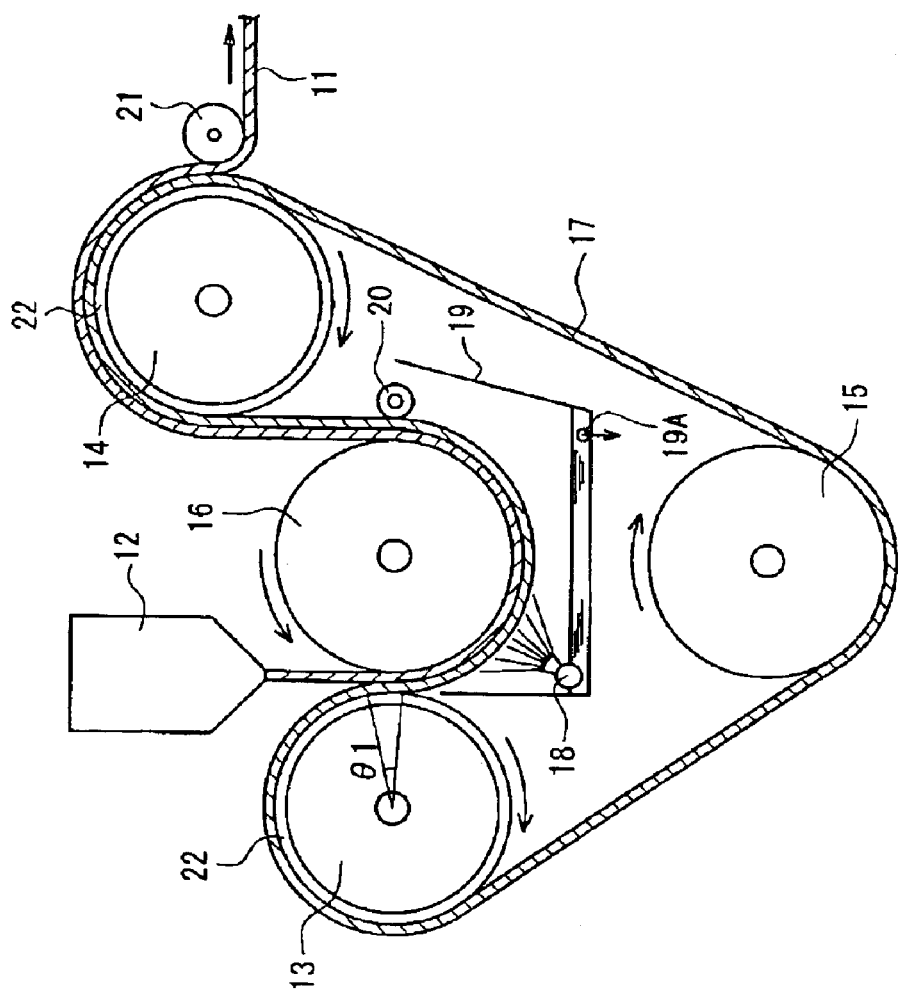
FIG. 1 is a schematic illustration of an apparatus for manufacturing an embodiment of low crystallizability polypropylene sheet according to the present invention.

FIG. 1 schematically illustrates a manufacturing apparatus 1 for manufacturing a low crystallizability polypropylene sheet according to the present invention.

Referring to FIG. 1, the manufacturing apparatus 1 has a T die 12 belonging to an extruder, a first cooling roll 13, a second cooling roll 14, a third cooling roll 15, a fourth cooling roll 16, a metal-made endless belt 17, a cooling water spray nozzle 18, a water tank 19, a water absorbing roll 20 and a peeling roll 21.

The first cooling roll 13, the second cooling roll 14 and the third cooling roll 15 are metal-made rolls and contain in the inside thereof respective water-cooling type cooling means (not shown) for regulating the surface temperatures of the respective roll surfaces.

The first and second cooling rolls 13, 14 are coated on the surfaces thereof with respective elastic members 22 typically made of nitrile-butadiene rubber (NBR). The elastic members 22 show a hardness of 60 degrees or less (as observed by a method conforming to JIS K6301A) and a thickness of 10 mm.

The rotary shaft of at least one of the first, second and third cooling rolls 13, 14, 15 is linked to a rotary drive means (not shown).

The fourth cooling roll 16 is a metal-made roll having a mirror plane whose surface coarseness is 1.0S or less and contains in the inside thereof a water-cooling type cooling means (not shown) that allows to regulate the surface temperature. If the surface coarseness is greater than 1.0S, the obtained polypropylene sheet 11 shows a low degree of gloss and becomes a poorly transparent sheet 11.

The fourth cooling roll 16 is arranged in such a way that the polypropylene sheet 11 is pinched between itself and the first cooling roll 13 with the metal-made endless belt 17 interposed between the polypropylene sheet 11 and the first cooling roll 13.

The endless belt 17 is made of stainless steel and has a mirror plane whose surface coarseness is 1.0S or less. The endless belt 17 is rotatably wound around the above described first, second and third cooling rolls 13, 14, 15.

The cooling water spray nozzle 18 is arranged below the fourth cooling roll 16. Cooling water is sprayed onto the rear surface of the endless belt 17 from the cooling water spray nozzle 18 to rapidly cool the endless belt 17 and also the polypropylene sheet 11 immediately after being two-dimensionally pressed by the first and fourth cooling rolls 13, 16.

The water tank 19 is box-shaped and open at the top side. It is arranged to entirely cover the part of the surface of the fourth cooling roll 16 that faces downward. The water tank 19 is adapted to collect the sprayed cooling water and discharge the collected water through a discharge port 19A arranged at the bottom of the water tank 19.

Water absorbing roll 20 is arranged vis-à-vis the fourth cooling roll 16 at a position located close to the second cooling roll 14 and held in contact with the endless belt 17. The roll 20 is adapted to remove excessive cooling water adhering to the rear surface of the endless belt.

The peeling roll 21 is arranged in such a way that it guides the low crystallizability polypropylene sheet 11, presses it against the endless belt 17 and the second cooling roll 14 and peels the cooled low crystallizability polypropylene sheet 11 from the endless belt 17.

Now, the method of manufacturing a low crystallizability polypropylene sheet 11 by means of a manufacturing apparatus 1 having a configuration as depicted above will be described.

Firstly, the temperature of the cooling rolls 13, 14, 15, 16 are controlled in advance so that the surface temperature of the endless belt 17 and that of the fourth cooling roll 16 are held higher than the dew point and lower than 30° C. before the polypropylene sheet 11 is brought into direct contact with the endless belt 17 and the fourth cooling roll 16.

When both the surface temperature of the fourth cooling roll 16 and that of the endless belt 17 are lower than the dew point, dew drops may be formed on the surfaces to make it difficult to form a uniform film. On the other hand, when both the surface temperatures are higher than 30° C., the obtained polypropylene sheet 11 may show an only poor level of transparency and the number of defective crystals may increase to make the thermoforming difficult. Therefore, the surface temperatures are held to 14° C. in this embodiment.

Then, the polypropylene sheet 11 extruded from the T die 12 of the extruder (not containing any nucleating agent) is pinched between the endless belt 17 and the fourth cooling roll 16 on the first cooling roll 13. Under this condition, the polypropylene sheet 11 is pressed between the first and fourth cooling rolls 13, 16 and rapidly cooled to 14° C.

At this time, the elastic member 22 is compressed to elastically deform by the pressure existing between the first cooling roll 13 and the fourth cooling roll 16.

Note that the polypropylene sheet 11 is two-dimensionally pressed on the elastically deformed part of the elastic member 22, which is an arcuate part that corresponds to the center angle θ1 of the first cooling roll 13, by the cooling rolls 13, 16. The pressure here is between 0.1 and 20 MPa.

The polypropylene sheet 11 that is pinched between the fourth cooling roll 16 and the endless belt 17 and pressed in a manner as described above is subsequently pinched between the arcuate part of endless belt 17, which substantially corresponds to the lower half peripheral surface of the fourth cooling belt 16, and the fourth cooling roll 16 and two-dimensionally pressed, while they are rapidly cooled further by cooling water sprayed onto the rear surface side of the endless belt 17 through the cooling water spray nozzle 18. The pressure here is between 0.01 and 0.5 MPa and the temperature of cooling water is 8° C.

The sprayed cooling water is then collected in the water tank 19 and discharged through the discharge port 19A.

After being two-dimensionally pressed and cooled by the fourth cooling roll 16, the polypropylene sheet 11 that is tightly adhering to the endless belt 17 is moved onto the second cooling roll 14 as a result of the rotary movement of the endless belt 17. Then, the polypropylene sheet 11, which is guided by the peeling roll 21 and pushed against the second cooling roll 14, is two-dimensionally pressed by the arcuate part of the endless belt 17, which substantially corresponds to the upper half peripheral surface of the second cooling roll 14, and cooled again at temperature lower than 30° C.

The pressure here is between 0.01 and 0.5 MPa.

The water adhering to the rear surface of the endless belt 17 is removed by the water absorbing roll 20 arranged on the moving path of the endless belt 17 between the fourth cooling roll 16 and the second cooling roll 14.

The polypropylene sheet 11 that is cooled on the second cooling roll 14 is peeled off from the endless belt 17 by the peeling roll 21 and taken up by a take-up roll (not shown) at a predetermined rate.

The polypropylene sheet 11 manufactured in a manner as described above has an average spherulite radius between 0.1 μm and 4 μm, an average number of spherulites of 600/mm$^2$ or less in a sheet cross section, a solid density of 0.895 g/cm$^3$ or less, a fusion enthalpy H of less than 90 J/g at the highest endothermic peak of the DSC curve (see FIG. 2), a degree of gloss of 90% or higher on at least one side, having an exothermic peak of 1 J/g or higher at the low temperature side of said highest endothermic peak (see FIG. 2) and a thickness of 50 μm or more.

A low crystallizability polypropylene sheet 11 that shows such a low level of crystallinity and is adapted to be thermoformed at low temperature can suitably be used for thermoforming a food container or a blister container.

The above described embodiment provides the following advantages.

(1) Since the obtained polypropylene sheet 11 does not contain any nucleating agent, it has a small average spherulite radius, a low solid density and a small average number of spherulites. Therefore, it is possible to obtain an excellent polypropylene sheet 11 that shows a low softening point and can be thermoformed at low temperature without any substantial internal haze. Additionally, the manufacturing cost can be reduced because no special forming apparatus is required to manufacture it.

(2) Since the fusion enthalpy H is relatively small and less than 90 J/g and the polypropylene sheet 11 emits heat at a rate of 1 J/g or more at the low temperature side, the polypropylene sheet 11 can be softened only by externally supplying heat at a low rate. Additionally, since the softening point is relatively low, it can be thermoformed with ease at low temperature.

(3) Since the polypropylene sheet 11 shows a degree of gloss of 90% or higher, the thermoformed product obtained by thermoforming the sheet can have a high commercial value.

(4) Since the surface coarseness of the fourth cooling roll 16 and that of the endless belt 17 are held to 1.0S or less, it is possible to obtain a low crystallizability polypropylene sheet 11 that shows a high degree of gloss and transparency.

(5) Since the surface temperature of the fourth cooling roll 16 and that of the endless belt 17 are held higher than the dew point and lower than 30° C., it is possible to obtain a low crystallizability polypropylene sheet 11 that is highly uniform in terms of thickness.

(6) Since cooling water is sprayed through a cooling water spraying nozzle 18 for cooling, the polypropylene sheet 11 is rapidly cooled to promote the low crystallinity of the polypropylene sheet 11.

(7) Since the polypropylene sheet 11 is two-dimensionally pressed and cooled by utilizing the elastic deformation of the elastic members 22, it is possible to achieve a high mirror plane transfer efficiency and a high cooling efficiency. Hence it is possible to manufacture a highly transparent and low crystallizability polypropylene sheet 11 at high speed.

The present invention is by no means limited to the above described embodiment, which may be modified and/or improved without departing from the scope of the present invention. For instance, in the above-described embodiment, while the endless belt 17 is wound around the first, second and third cooling rolls 13, 14, 15, the present invention is by no means limited to such an arrangement. An appropriate number of cooling rolls may be arranged and the endless belt may be wound around them so long as they can provide the endless belt with a rotary movement and effectively cool the latter.

While a mirror plane stainless belt is used for the endless belt 17 of the above described embodiment, the present invention is by no means limited thereto provided that the endless belt 17 shows a surface coarseness of 1.0S or less. For example, a metal-made endless belt whose surface is coated with polyimide resin or fluorine resin such as polytetrarluoroethylene may alternatively be used.

While elastic members 22 made of NBR that show a hardness of 60 degrees and a thickness of 10 mm are used for the elastic members 22 in the above described embodiment, the present invention is by no means limited thereto. Any elastic members that show a predetermined level of hardness and has a predetermined thickness and is adapted to be elastically deformed when pressing the polypropylene sheet may be used for the purpose of the invention. For example, elastic members made of silicon or the like may alternatively be used.

While both the surface temperature of the fourth cooling roll 16 and that of the endless belt 17 are held to 14° C. in the above described embodiment, the present invention is by no means limited thereto. Any other temperature level higher than the dew point and lower than 30° C. may be used.

While 8° C. is selected for the temperature of water being sprayed through the cooling water spraying nozzle 18, the present invention is by no means limited thereto. Any other temperature may be selected for the temperature of cooling water so long as it is lower than the surface temperature of the fourth cooling roll 16 and that of the endless belt 17.

In addition, the specific configuration, profile or the like to carry out the present invention may be defined appropriately so long as the object of the present invention can be achieved.

Now, the present invention will be described further by way of examples and comparative examples.

EXAMPLE 1

In this example, a manufacturing apparatus 1 and a manufacturing method as defined below were used to obtain a low crystallizability polypropylene sheet 11.

diameter of extruder: 90 mm width of T die 12: 800 mm polypropylene: Idemitsu Polypro E-304GP (tradename, available from Idemitsu Petrochemical Co., Ltd. (melt flow index: 3 g/10 min, homo polypropylene)

sheet take-off rate: 10 m/min surface temperature of fourth cooling roll 16 and endless belt 17: 14° C.

cooling water temperature: 8° C.

cooling water spraying rate: 200 liter/min

EXAMPLE 2

A low crystallizability polypropylene sheet 11 was obtained in a manner as described above for Example 1 except that random polypropylene (Idemitsu Polypro F534N4: tradename, available from Idemitsu Petrochemical Co., Ltd.) was used as polypropylene.

EXAMPLE 3

A low crystallizability polypropylene sheet 11 was obtained in a manner as described above for Example 1 except that petroleum resin was added to homo polypropylene of Example 1 by 3 wt %.

COMPARATIVE EXAMPLE 1

Gel all MD (tradename: available from New Japan Chemical Co., Ltd.) was added to homo polypropylene of Example 1 by 0.3% and the melt web extruded from the T die extruder was cooled by blowing air to the surface thereof opposite to the surface contacting the cooling rolls (air knife method) to obtain a polypropylene sheet.

COMPARATIVE EXAMPLE 2

Homo polypropylene of Example 1 and the manufacturing method of Comparative Example 1 were used to obtain a polypropylene sheet.

COMPARATIVE EXAMPLE 3

Homo polypropylene of Example 1 to which a nucleating agent was added by 0.3% and the manufacturing method of Example 1 were used to obtain a polypropylene sheet.

COMPARATIVE EXAMPLE 4

Homo polypropylene of Example 1 was used but the rate of extrusion of the T die extruder was limited and stress was relieved until the melt web coming from the T die became transparent. Under this condition the extruded melt web was made to pass through the water tank for cooling (water cooling method) and the obtained polypropylene sheet was additionally annealed.

The polypropylene sheets obtained in the above examples and comparative examples were observed for thickness, average spherulite radius, average number of spherulites per unit cross sectional area, presence or absence of a peak in the DSC curve, fusion enthalpy, internal haze, degree of surface gloss and tensile modulus. Tables 1 and 2 summarily show the obtained results.

TABLE 1

| | Thickness (mm) | Average spherulite radius ($\mu$m) | Spherulites density (crystals/mm$^2$) | Presence or absence of peak in DSC curve |
|---|---|---|---|---|
| Example 1 | 0.3 | 3 | 100 | present |
| Example 2 | 0.3 | 3 | 100 | present |
| Example 3 | 0.3 | 3 | 100 | present |
| Comp. Ex. 1 | 0.3 | 5 | 2000 | absent |
| Comp. Ex. 2 | 0.3 | 7 | 400 | absent |
| Comp. Ex. 3 | 0.3 | 5 | 2000 | absent |
| Comp. Ex. 4 | 0.3 | 3 | 100 | absent |

*Translator's comment; the term "Spherulites density" on the table 1 should be corrected to "Average number of spherulites" conformable to the lines 15–16 of page 12.

TABLE 2

| | Fusion enthalpy (J/kg) | Internal haze (%) | Gloss (%) | Tensile modulus (MPa) | Solid density (g/cm$^3$) |
|---|---|---|---|---|---|
| Example 1 | 83.4 | 2.1 | 141 | 1150 | 0.888 |
| Example 2 | 80.0 | 1.8 | 143 | 1100 | 0.886 |
| Example 3 | 81.0 | 1.7 | 145 | 1400 | 0.886 |
| Comp. Ex. 1 | 90.0 | 9.5 | 73 | 1800 | 0.901 |
| Comp. Ex. 2 | 95.0 | 18.3 | 52 | 1550 | 0.900 |
| Comp. Ex. 3 | 89.0 | 5.1 | 130 | 2000 | 0.901 |
| Comp. Ex. 4 | 92.0 | 3.8 | 100 | 1800 | 0.900 |

Each of the above test items was observed in a manner as described below.

(1) Average Spherulite Radius

A cross section of the obtained sheet was observed through a polarizing microscope.

(2) Presence or Absence of a Peak in the DSC Curve

If an exothermic peak exists at the low temperature side of the highest endothermic peak on the thermal analysis curve (see FIGS. 2 and 3) was examined by means of a differential scanning calorimeter (DSC-7: tradename, available from PARKINELMER LIFE & ANALYTICAL SCIENCES JAPAN Co., Ltd) under the following conditions.

temperature at start of observation: 25° C.

temperature at end of observation: 190° C.

temperature rising rate: 10° C./min (3) Fusion Enthalpy

Figure 2:
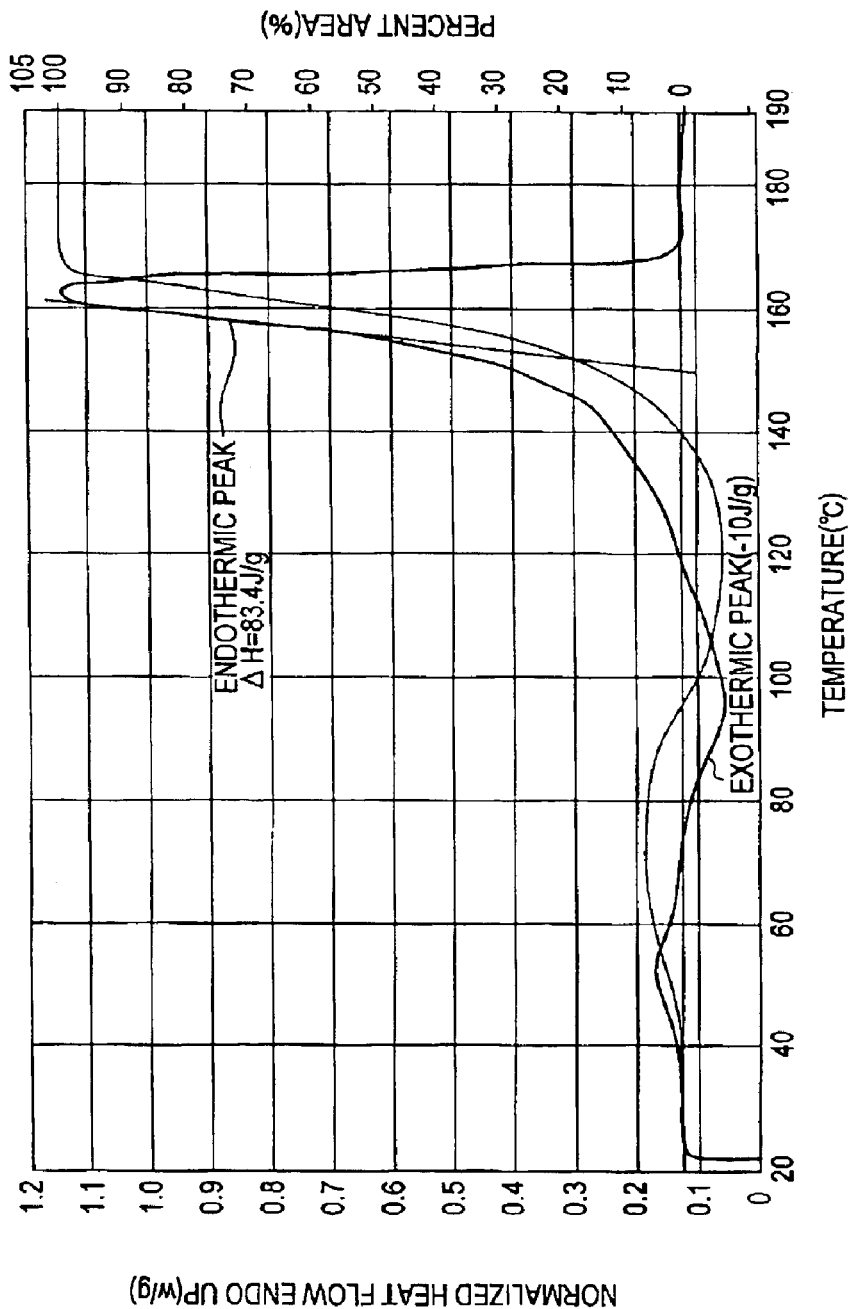
FIG. 2 is a graph showing the differential scanning calorimetry curve of the polypropylene sheet obtained in Example 1.
Figure 3:
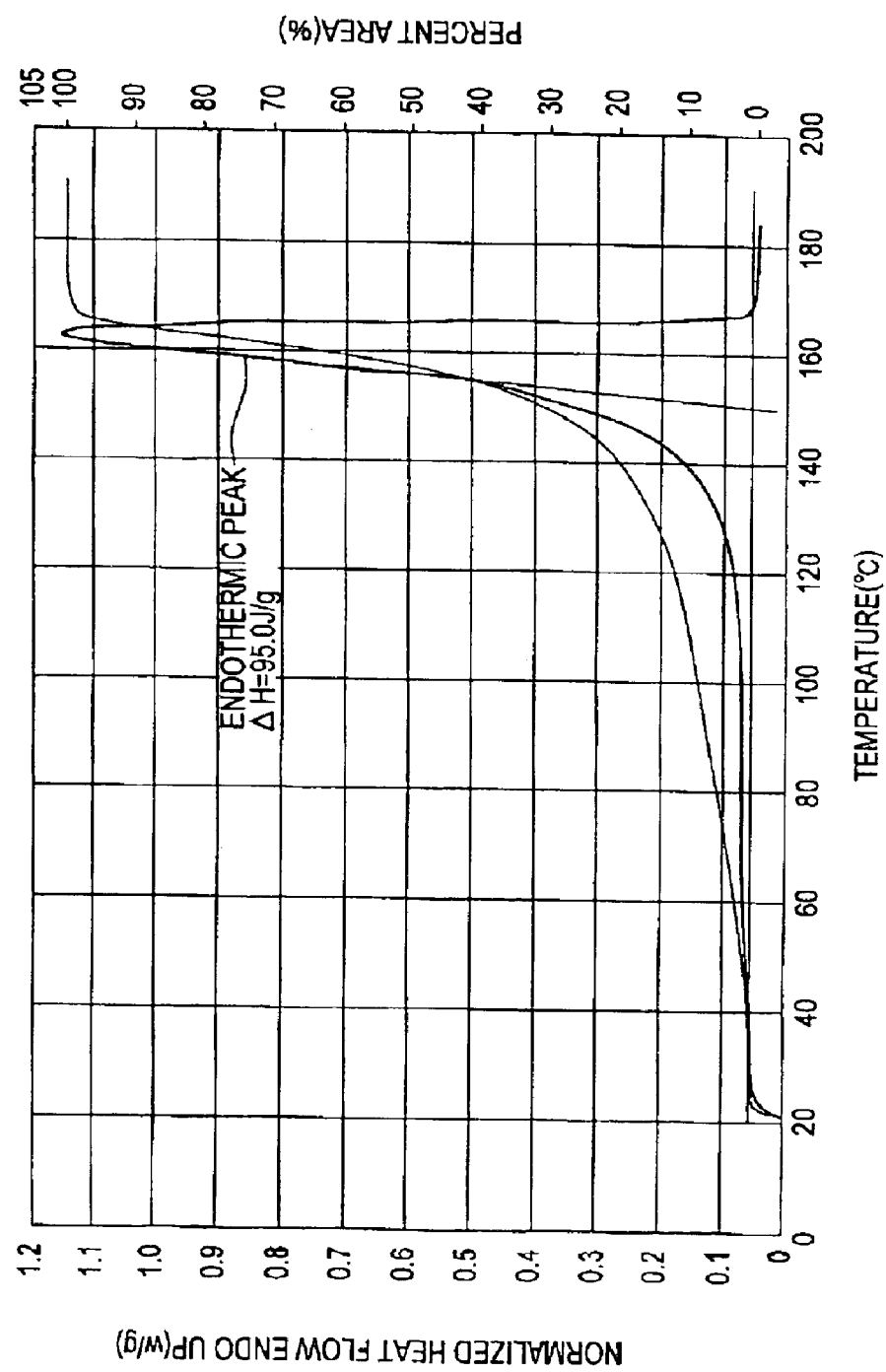
FIG. 3 is a graph showing the differential scanning calorimetry curve of the polypropylene sheet obtained in Comparative Example 2.

This was obtained from the area of the highest endothermic peak on the differential scanning calorimetry curve of item (2) (see FIGS. 2 and 3).

(4) Internal Haze

After applying silicon oil on the opposite surfaces of the polypropylene sheet, the sheet was sandwiched between a pair of glass panel and the influence of the outside of the sheet was eliminated before observing the internal haze in a manner as described below. A haze meter (NHD-300A: tradename, available from Nippon Denshoku Co., Ltd.) was used and the polypropylene sheet was irradiated with light. The internal haze was determined from the ratio of the transmitted quantity of diffused rays of light (Td), which was the transmitted quantity of rays of light diffused by the sheet, to the total transmitted quantity of rays of light (Tt), using the formula below. The total transmitted quantity of rays of light (Tt) refers to the sum of the transmittivity of parallel rays of light (Tp) that are transmitted coaxially with incident rays of light and the transmittivity of diffused rays of light (Td).

Haze $(H)=Td/Tt \times 100$ (5) Degree of Surface Gloss

An automatic colorimetric color difference meter (AUD-CH-2 Type45, 60: tradename, available from Suga Test Instruments Co., Ltd.) was used. The sheet was irradiated with light striking at an incident angle of 60° and the reflected flux of light ψs received at the same angle was observed. The degree of surface gloss was determined from the ratio of the reflected flux of light ψs to the reflected flux of light (ψ0s) from the surface of glass showing a refractive index of 1.567, using the formula below.

degree of surface gloss $(Gs)=(\psi s/\psi 0s) \times 100$ (6) Tensile Modulus

This was observed by using an MD method conforming to JIS K7113.

Table 3 summarizes the thermoformability, the thickness of the formed container, the internal haze and the tensile modulus obtained as a result of forming a 10 mm-deep φ100 transparent container from each of the polypropylene sheets prepared in the above examples and comparative examples by means of an ordinary vacuum forming machine.

The thermoformability as used herein refers to the temperature range in which a container can be formed without losing the transparency when formed by means of the above forming machine. The internal haze and the tensile modulus were observed in a manner as described above.

TABLE 3

|  | Thermoformability (° C.) | Thickness (mm) | Internal haze (%) | Tensile modulus (MPa) |
|---|---|---|---|---|
| Example 1 | 133~143 | 0.25 | 1.8 | 1900 |
| Example 2 | 130~140 | 0.26 | 1.5 | 1800 |
| Example 3 | 130~140 | 0.25 | 1.3 | 2050 |
| Comp. Ex. 1 | 138~142 | 0.25 | 9.0 | 1950 |
| Comp. Ex. 2 | 138~141 | 0.26 | 17.1 | 1800 |
| Comp. Ex. 3 | 138~142 | 0.25 | 4.3 | 2020 |
| Comp. Ex. 4 | 138~142 | 0.26 | 5.4 | 1900 |

As seen from Tables 1, 2 and 3, each of the polypropylene sheets 11 obtained in Examples 1 through 3 was a low crystallizability polypropylene sheet 11 having an average spherulite radius between 0.1 μm and 4 μm, an average number of spherulites of 600/mm² or less, a degree of surface gloss of 90% or higher and a solid density of 0.895 g/cm³ or less, whose thickness is 50 μm or more because it was formed by using an endless belt 17 and cooled rapidly.

When the internal haze is computed by using the above formula, assuming that the sheet has a thickness of t=0.3 mm, it is 4.7%. However, the internal haze of each of the polypropylene sheets 11 obtained in Examples 1 through 3 was between 1.7 and 2.1%, which are by far lower than 4.7%.

The fusion enthalpy H of each of the sheets 11 obtained in the examples was relatively low and found between 80 and 83.4 J/kg, showing an exothermic peak at the low temperature side of the melting point as seen from FIG. 2. Therefore, such a sheet can be thermoformed at low temperature (see Table 3) over a wide temperature range. In other words, a polypropylene sheet 11 according to the invention can be thermoformed with ease.

Additionally as seen from Table 3, the thermoformed product obtained by thermoforming each of the polypropylene sheets 11 of the examples was highly transparent with its internal haze found between 1.3 and 1.8% and its tensile modulus found between 1,800 and 2,050 MPa, which are higher than 1,700 MPa To the contrary, the polypropylene sheet of Comparative Example 1 was prepared by adding a nucleating agent and using an air knife method for forming film. Therefore, while the obtained sheet was transparent to a certain extent, it showed a low degree of surface gloss and a high crystallinity level due to the effect of an increased density of spherulites caused by the addition of the nucleating agent. Hence, the fusion enthalpy of the obtained sheet was high to degrade the thermoformability.

The polypropylene sheet of Comparative Example 2 was poorly transparent and showed a low degree of surface gloss because no nucleating agent was added for forming film.

While a process same as that of Example 1 was used for forming film in Comparative Example 3, the polypropylene sheet showed a high density of spherulites and a high crystallinity level because a nucleating agent was added to the raw resin material. As a result, the thermoformability was poor.

Film was formed by means of a water cooling method in Comparative Example 4 and stress was relieved until the melt web from the T die became transparent so that the thermoformability, the transparency and the gloss of the polypropylene sheet 11 were relatively good but not as good as those of the polypropylene sheet 11 prepared in of each of the examples. Additionally, since the sheet obtained by the water cooling method was not flat, it was annealed to improve its flatness. However, the fusion enthalpy was raised as a result of the annealing to degrade the thermoformability.

INDUSTRIAL APPLICABILITY

A polypropylene sheet according to the present invention can be utilized for a thermoformed product that is highly transparent and glossy. Therefore it can suitably be used for various packaging applications. For example, it may advantageously be used for a food container.

What is claimed is:

1. A low crystallizability polypropylene sheet characterized in that it has an average spherulite radius between 0.1 μm and 4 μm, an average number of spherulites of 600/mm² or less in a sheet cross section, a solid density of 0.895 g/cm³ or less, a fusion enthalpy H of less than 90 J/g at the highest endothermic peak of the differential scanning calorimetry (DCS) curve, a degree of gloss of 90% or higher on at least one side, and shows an exothermic peak of 1 J/g or higher at the low temperature side of said highest endothermic peak and a thickness of 50 μm or more.

2. The low crystallizability polypropylene sheet according to claim 1, characterized in that its internal haze is not higher than $(330t^2-150t\ 20)\%$, where t is the thickness of the low crystallizability polypropylene sheet.

3. The low crystallizability polypropylene sheet according to claim 1, characterized in that its tensile modulus is 1,500 MPa or less.

4. The low crystallizability polypropylene sheet according to claim 1, comprising a material selected from the group consisting of homo polypropylene, random polypropylene, block polypropylene, and mixtures thereof.

5. The low crystallizability polypropylene sheet according to claim 4, said material further comprising petroleum resin, terpene resin, or a combination thereof.

6. The low crystallizability polypropylene sheet according to claim 2, characterized in that its tensile modulus is 1,500 MPa or less.

7. The low crystallizability polypropylene sheet according to claim 2, comprising a material selected from the group consisting of homo polypropylene, random polypropylene, block polypropylene, and mixtures thereof.

8. The low crystallizability polypropylene sheet according to claim 3, comprising a material selected from the group consisting of homo polypropylene, random polypropylene, block polypropylene, and mixtures thereof.

9. The low crystallizability polypropylene sheet according to claim 6, comprising a material selected from the group consisting of homo polypropylene, random polypropylene, block polypropylene, and mixtures thereof.

10. The low crystallizability polypropylene sheet according to claim 7, wherein said raw material further comprises petroleum resin, terpene resin, or a combination thereof.

11. The low crystallizability polypropylene sheet according to claim 8, wherein said raw material further comprises petroleum resin, terpene resin, or a combination thereof.

12. The low crystallizability polypropylene sheet according to claim 9, wherein said raw material further comprises petroleum resin, terpene resin, or a combination thereof.

13. A method of manufacturing a shaped article comprising thermoforming the sheet of claim 1 into said shaped article.

14. A shaped article manufactured by the method of claim 13.

* * * * *